US006882936B2

(12) United States Patent
Desjardins

(10) Patent No.: US 6,882,936 B2
(45) Date of Patent: Apr. 19, 2005

(54) INTEGRATED GPS/INTERFERENCE LOCATION SYSTEM WITH ANTI-JAM PROCESSOR

(75) Inventor: Gerard A. Desjardins, Endicott, NY (US)

(73) Assignee: Lockheed Martin Corporation, Bethesda, MD (US)

(*) Notice: Subject to any disclaimer, the term of this patent is extended or adjusted under 35 U.S.C. 154(b) by 216 days.

(21) Appl. No.: 10/376,638

(22) Filed: Mar. 3, 2003

(65) Prior Publication Data

US 2004/0176909 A1 Sep. 9, 2004

(51) Int. Cl.[7] .............................................. G01S 5/14
(52) U.S. Cl. .................. 701/213; 375/346; 342/357.15; 342/357.06; 455/11.1; 455/3.02; 455/427
(58) Field of Search ................................. 701/213, 214; 342/357.06, 357.12, 357.02, 357.1, 357.15; 455/12.1, 456.1, 232.1, 13.14, 234.2, 3.02, 20, 427, 74, 429, 67.1, 426, 11.1, 522, 69; 375/346; 370/329, 341

(56) References Cited

U.S. PATENT DOCUMENTS

| | | | |
|---|---|---|---|
| 5,008,679 A | 4/1991 | Effland et al. ............... 342/353 |
| 5,570,096 A | 10/1996 | Knight et al. ............... 342/357 |
| 5,594,452 A | 1/1997 | Webber et al. .............. 342/353 |
| 5,844,521 A | 12/1998 | Stephens et al. ............ 342/357 |
| 5,936,571 A | 8/1999 | Desjardins ................... 342/357 |
| 5,990,827 A | 11/1999 | Fan et al. .............. 342/357.11 |
| 6,018,312 A | 1/2000 | Haworth ..................... 342/353 |
| 6,335,920 B1 * | 1/2002 | Strodtbeck et al. ......... 370/318 |
| 6,684,057 B1 * | 1/2004 | Karabinis ................... 455/12.1 |
| 2002/0047799 A1 * | 4/2002 | Gustafson et al. ...... 342/357.12 |
| 2002/0058475 A1 * | 5/2002 | Patsiokas ................... 455/3.02 |
| 2003/0085837 A1 * | 5/2003 | Abraham ................. 342/357.1 |
| 2004/0087270 A1 * | 5/2004 | Krasner ..................... 455/12.1 |

FOREIGN PATENT DOCUMENTS

JP 09280872 A * 10/1997 ........... G01C/19/72

OTHER PUBLICATIONS

Fante, et al., "Wideband Cancellation of Interference in a GPS Receive Array," IEEE Transactions on Aerospace and Electronic Systems, vol. 36, No. 2, pp. 549–564, Apr., 2000.

Stein, "Algorithms for Ambiguity Function Processing," IEEE Transactions of Acoustics, Speech, and Signal Processing, vol. ASSP–29, No. 3, pp. 588–599, Jun. 1981.

"Navstar GPS Space Segment/Navigation User Interfaces," Arinc Research Corporation, Unclassified version, Oct. 10, 1993.

"Technical Characteristics of the Navstar GPS," Navtech Seminars & Navtech Book and Software Store, Inc., For Public Release, Jun. 1991, Reprinted Oct., 1993.

* cited by examiner

Primary Examiner—Thomas G. Black
Assistant Examiner—Tuan C To
(74) Attorney, Agent, or Firm—Finnegan, Henderson, Farabow, Garrett & Dunner, L.L.P.

(57) ABSTRACT

A user set determines a location of an interference signal by receiving a satellite signal and an interference signal and increasing the interference signal-to-noise ratio to produce a first output signal and by increasing the satellite signal-to-noise ratio to produce a second output signal.

36 Claims, 7 Drawing Sheets

_US 6,882,936 B2_

INTEGRATED GPS/INTERFERENCE LOCATION SYSTEM WITH ANTI-JAM PROCESSOR

FIELD OF THE INVENTION

The present invention generally relates to satellite based navigation devices and, more particularly to systems and methods for locating interference sources.

BACKGROUND OF THE INVENTION

A satellite based navigation device works by receiving and processing satellite signals from a global navigation satellite system such as the Global Positioning System (GPS), which consists of twenty-four satellites that orbit the earth and transmit signals that are received by the navigational device. A detailed description of GPS can be found in U.S. Government documents, Technical Characteristics of the Navstar GPS, June 1991, and GPS Interface Control Document, ICD-GPS-200, October, 1993.

Satellite based navigation devices have been used for many years to assist in navigation. Initially, GPS navigation devices were used for military applications. Today, in addition to military applications, satellite based navigation devices are used commercially and privately in automobiles, boats, and aircraft, for example. Unfortunately, satellite signals are susceptible to interference, both unintentional and intentional, due to the low power level of the satellite signals. Signals from cellular telephones and television transmitters, for example, may unintentionally interfere with satellite signals. However, intentional interference, i.e., jamming, may also interfere with the satellite navigation signals. When interference occurs, the performance of the navigation device may degrade.

To maintain or improve the performance of a satellite based navigation device in the presence of interference, a system for locating the source of the interference was developed by the Lockheed Martin Corporation and is described in U.S. Pat. No. 5,936,571 ("the '571 patent"), which is incorporated herein by reference. By knowing the location of the interference, the performance of the navigation device may be maintained or enhanced in the presence of the interference by, for example, avoiding the interference, i.e., planning a route that minimizes the impact of the interference, or eliminating the interference. The present invention utilizes anti-jam processing to enhance the performance of certain embodiments disclosed in the '571 patent.

SUMMARY OF THE INVENTION

In accordance with the invention, a user set is provided for facilitating the location of a first interference signal. The user set comprises at least one antenna element for receiving an incoming signal wherein the incoming signal at least comprises a satellite signal and the first interference signal. The user set further comprises an anti-jam processor configured to process the incoming signal received from the at least one antenna element to increase the first interference signal-to-noise ratio thereby producing a first output signal. The anti-jam processor is further configured to process the incoming signal received from the at least one antenna element to increase the satellite signal-to-noise ratio thereby producing a second output signal.

There is further provided a method for facilitating the location of a first interference signal. The method comprises receiving an incoming signal from at least one antenna element wherein the incoming signal at least comprises a satellite signal and the first interference signal, processing the incoming signal received from the at least one antenna element to increase the first interference signal-to-noise ratio thereby producing a first output signal; and processing the incoming signal received from the at least one antenna element to increase the satellite signal-to-noise ratio thereby producing a second output signal.

Advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitutes a part of this specification, illustrate exemplary embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
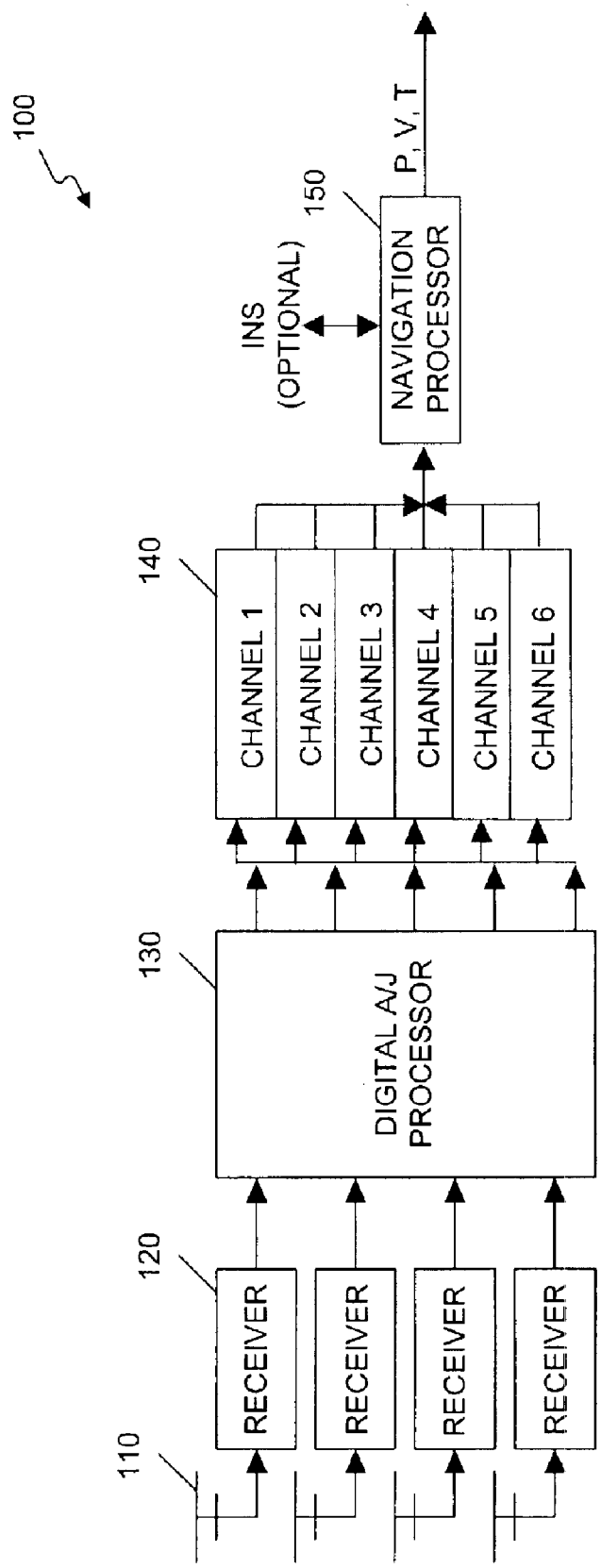
FIG. 1 illustrates a typical satellite based navigation device with an A/J processor.

FIG. 1 illustrates a typical satellite based navigation device 100 comprising antennas 110, receivers 120, a digital anti-jam (A/J) processor 130, one or more satellite navigation signal processing channels 140, and a navigation processor 150. Generally, the satellite based navigation device 100 utilizes satellite signals to compute its position (P), velocity (V), and time (T) (hereinafter PVT).

The antennas 110 may receive signals from one or more satellites in a global navigation satellite system (GNSS) such as the Global Positioning System (GPS) or the Global Satellite Navigation System (GLONASS). However, for the satellite based navigation device 100 to unambiguously compute its position in three dimensions, without information from any other sources, tracking of four satellite signals may be needed.

Generally, the receivers 120 filter, downconvert, and digitally sample the satellite signals received by the antennas 110. The digitized outputs from the receivers 120 are passed to the digital A/J processor 130. Generally, the digital A/J processor 130 computes and applies weights to the downconverted, digitized signals received from the receivers 120, sums the weighted signals, and outputs the summed weighted signals to the processing channels 140.

Figure 2:
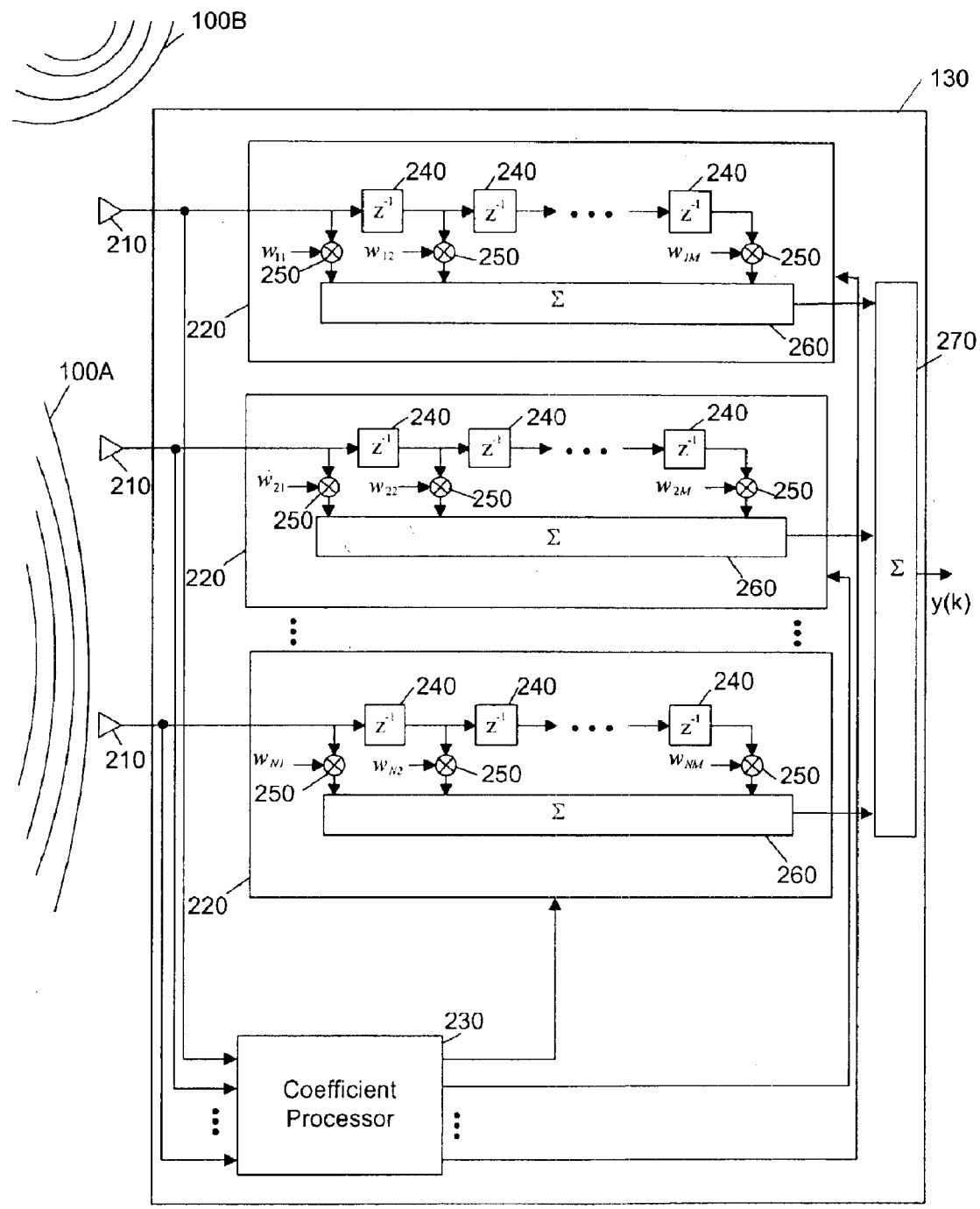
FIG. 2 illustrates an exemplary digital A/J processor for use in a navigation device.

FIG. 2 illustrates an exemplary digital A/J processor 130 for use in the navigation device 100. The digital A/J processor 130 may comprise N multiple tapped delay line structures 220 comprising M taps, a coefficient processor 230, and an adder 270. Each of the multiple tapped delay line structures 220 may comprise M-1 delay elements 240, M multipliers 250, and an adder 260. Generally, each of the multiple tapped delay structures 220 may be a FIR filter.

The N antenna elements 210 receive one or more satellite signals 100A and one or more interference signals 10B. Each antenna element 210 is connected to a corresponding multiple tapped delay line structure 220. Although not shown in FIG. 1, the signals 10A, 100B received by each antenna elements 210 may undergo preprocessing prior to being received by the multiple tapped delay line structures 220 and the coefficient processor 230. For example, the signals received by each antenna elements 210 may be processed by receivers 120 to convert the signals to a suitable intermediate frequency. The signals may be further downconverted, filtered by a bandlimited filter, and sampled by an analog-to-digital converter. Still further, the signals may be converted to complex baseband signals by, for example, digital demodulation or Hilbert transform type processing prior to being input to the multiple tapped delay line structures 220 and the coefficient processor 230.

The digital A/J processor 130 receives the signals 100A, 100B from the antennas 210 and computes filter coefficients (i.e., weights), $w_{nm}$, which are applied to the multiple tapped delay line structures 220 for processing the signals 100A, 100B. The filter coefficients, $w_{nm}$, are computed by the coefficient processor 230. System and methods for computing the filter coefficients, $w_{nm}$, are known to those of ordinary skill in the art. The outputs from the multiple tapped delay line structures 220 are then summed together by the adder 270 to generate output samples that are applied to one or more processing channels 140.

For each satellite being tracked, the digital A/J processor 130 may compute and apply weights to the signals received from the receivers 120, sum the weighted signals, and output the summed weighted signals to a corresponding processing channels 140. For example, if four satellite signals are being tracked, then the digital A/J processor 130 may compute four different sets of weights to be applied to the signals received from the receivers 120. The output samples corresponding to the first set of weights may be input to a first processing channel 140 (1); output samples corresponding to the second set of weights may be input to a second processing channel 140 (2); output samples corresponding to the third set of weights may be input to a third processing channel 140 (3); and output samples corresponding to the fourth set of weights may be input to a fourth processing channel 140 (4).

Alternative systems and methods for implementing the digital A/J processor 130 are known to those of ordinary skill in the art. For example, alternative exemplary implementations of the digital A/J processor 130 may be found in R. L. Fante and J. J. Vaccaro, "Wideband Cancellation of Interference in a GPS Receive Array," IEEE Transactions on Aerospace and Electronic Systems, Vol. 36, no. 2 (April 2000).

As illustrated in FIG. 1, the navigation device 100 may include four processing channels 140 to track four satellites and additional processing channels 140 to provide additional redundant data to improve performance, for example. The processing channels 140 may be physically different channels or may comprise the same hardware to process signals from different satellites or a combination thereof.

Each processing channel 140 extracts relevant information from the satellite signals such as relative time of arrival, signal carrier phase, and a satellite navigation message. This information is then used by a navigation processor 150 to provide the PVT of the navigation device 100.

The information in the processing channels 140 is subjected to correlation processing (generally implemented using a matched filter since the satellite signal is known) to make precision time and frequency measurements using the same antenna and using a common time base and coordinate system across all sets of data provided by the satellite signals and across all navigation devices 100. Such processing includes clock frequency and time offset measurement. Satellite based navigation devices 100 thus use information derived from the arrival time and frequency of signals from a plurality of synchronized emitters at known locations to determine its PVT.

Figure 3:
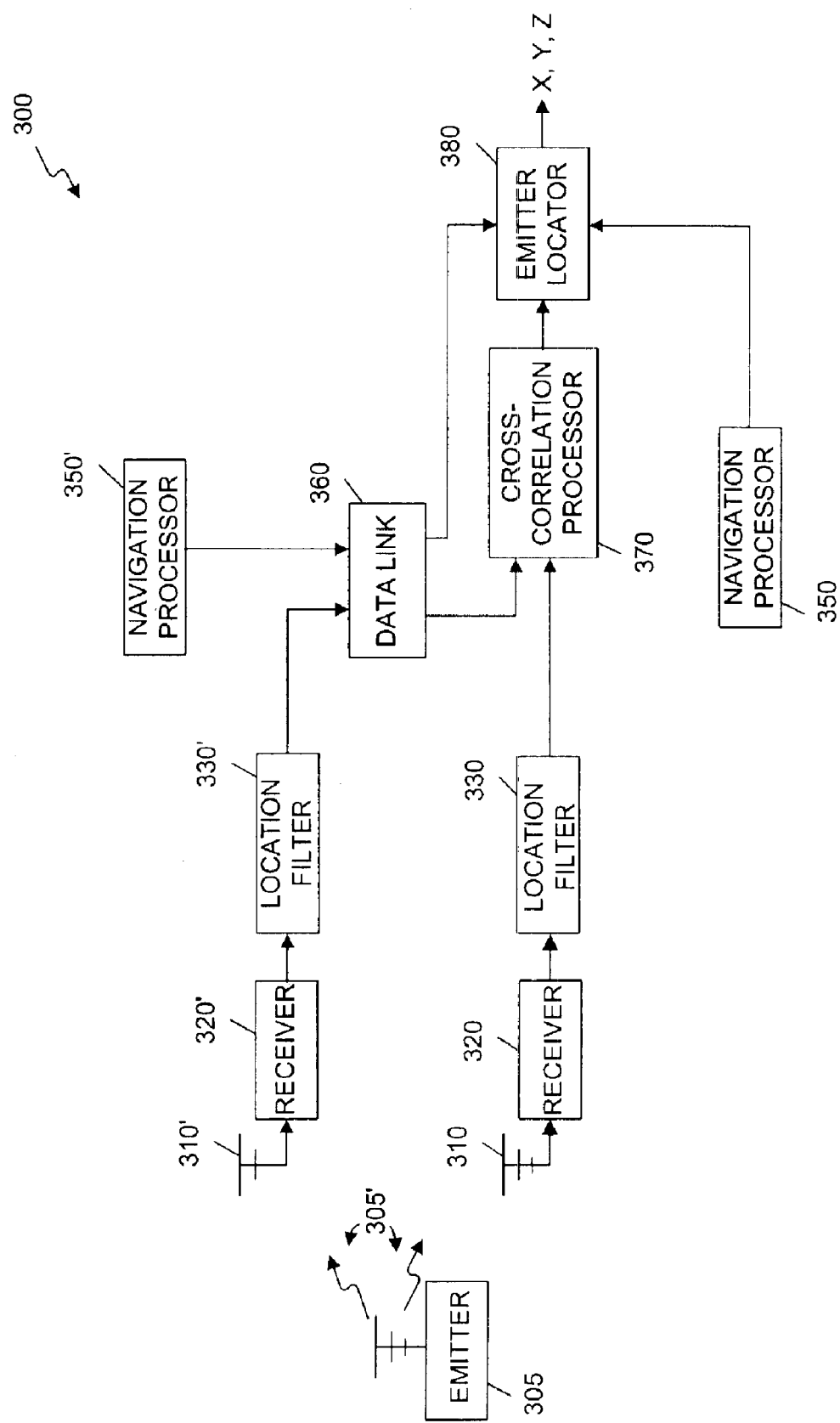
FIG. 3 illustrates a two platform TDOA/FDOA emitter location system.

FIG. 3 illustrates a two platform TDOA/FDOA emitter location system 300. A first platform comprises an antenna 310, a receiver 320, a location filter 330, a navigation processor 350, a data link 360, a cross-correlation processor 370, and an emitter locator 380. A second platform comprises an antenna 310', a receiver 320', a location filter 330', a navigation processor 350', and a data link 360. Generally, the first platform locates an emitter 305 based on navigation information of the first and second platform and based on "time difference of arrival" (TDOA) and "frequency difference of arrival" (FDOA) information of a signal 305' emitted from the emitter 305 and intercepted by antennas 310, 310'.

The signal 305' from emitter 305 is intercepted by antennas 310, 310'. The intercepted signals are filtered, downconverted, and sampled by receivers 320, 320' and digitally filtered by location filters 330, 330' in preparation for correlation processing. Navigation processors 350, 350' compute navigation information, such as platform position, velocity, and time, of the first and second platform, respectively, during a collection interval. The navigation information from the navigation processor 350' and the filtered signal data from the location filter 330' are transmitted to the first platform via a data link 360. At the first platform, the filtered signal data from the location filter 330 is cross-correlated with the filtered signal data from the location filter 330'. The cross-correlation processor 370 computes the TDOA and FDOA of the emitter signal 305'. The emitter locator 380 computes the location of the emitter 305 based on the TDOA and FDOA information provided by processor 370 and based on the navigation information provided by navigation processors 350, 350'.

Two platforms may be sufficient to locate the emitter 305 in two dimensions (x,y), if at least one of the platforms is moving. A minimum of three platforms may be used if all three platforms are stationary.

Like satellite based navigation devices, TDOA/FDOA emitter location systems make precision time and frequency measurements and require clock frequency and time offset calibration. Further, TDOA/FDOA emitter location systems use a common time base and coordinate system across all participating platforms. Finally, TDOA/FDOA emitter location systems use platform PVT data to transform the TDOA/FDOA measurements into emitter location coordinates.

The '571 patent exploits the similarities and interrelationships between satellite based navigation systems and TDOA/FDOA location systems to arrive at a highly integrated solution for locating interference signals. The present invention utilizes anti-jam processing to enhance the performance of embodiments disclosed in the '571 patent. Unlike, prior art systems that use anti-jam processing to suppress interference signals, the present invention may utilize anti-jam processing to increase interference signal-to-noise ratios (SNRs).

Figure 4:
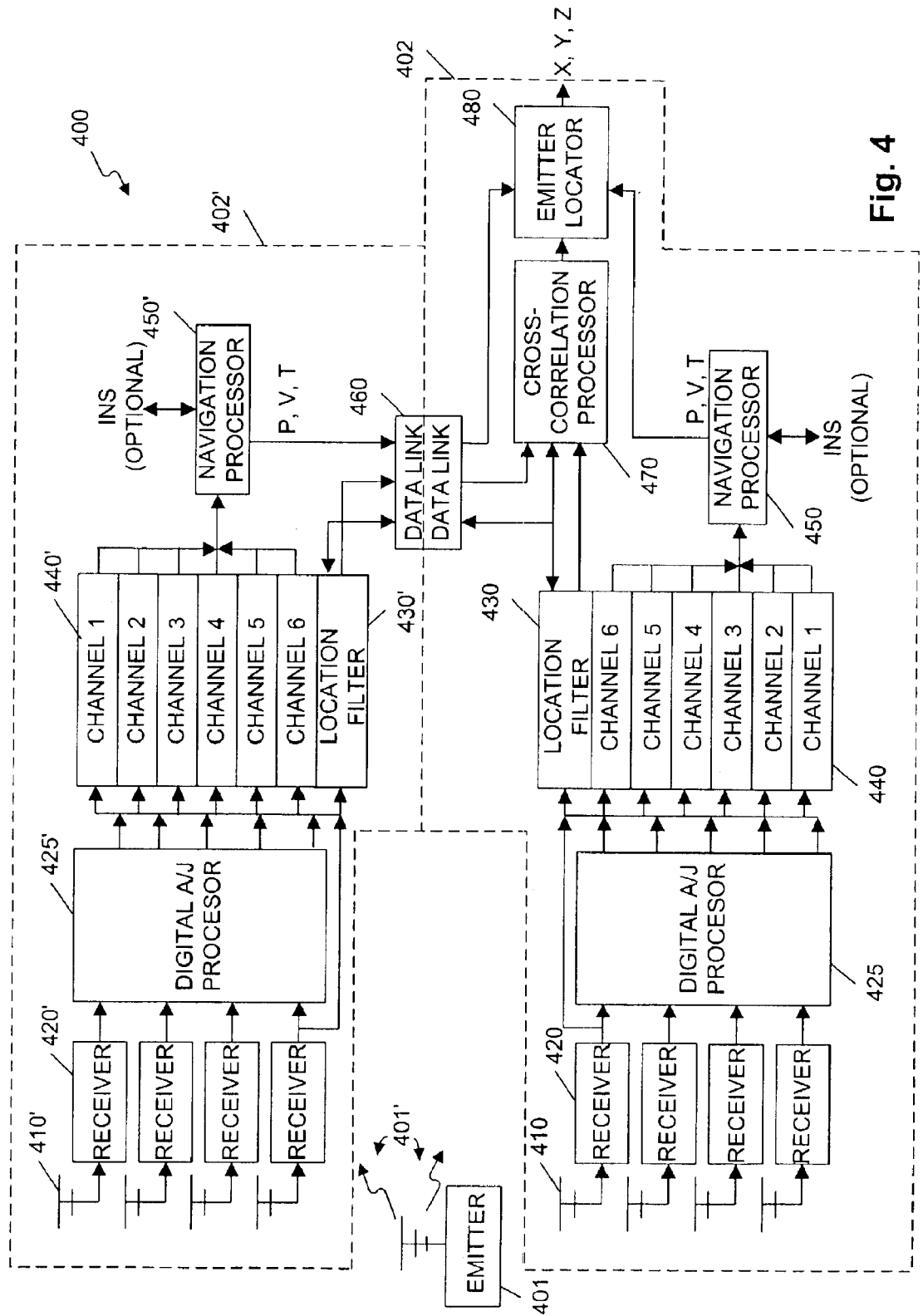
FIG. 4 illustrates a first embodiment of a satellite based navigation system for locating an interference source consistent with the present invention.

FIG. 4 illustrates a satellite based navigation system 400 for locating an interference source 401 emitting an interference signal 401' using two satellite based user sets 402, 402'. Each user set 402, 402' comprises antennas 410, 410', receivers 420, 420', a digital A/J processor 425, 425', a location filter 430, 430', a plurality of processing channels 440, 440', and a navigation processor 450, 450'. Each user set 402, 402' has access to a data link 460 that interconnects the two user sets 402, 402'. Further, both sets of antennas 410, 410' intercept the interference signal 401' from the interference source 401 to be located. User set 402 further comprises a cross-correlation processor 470 and an emitter locator 480.

Figure 5:
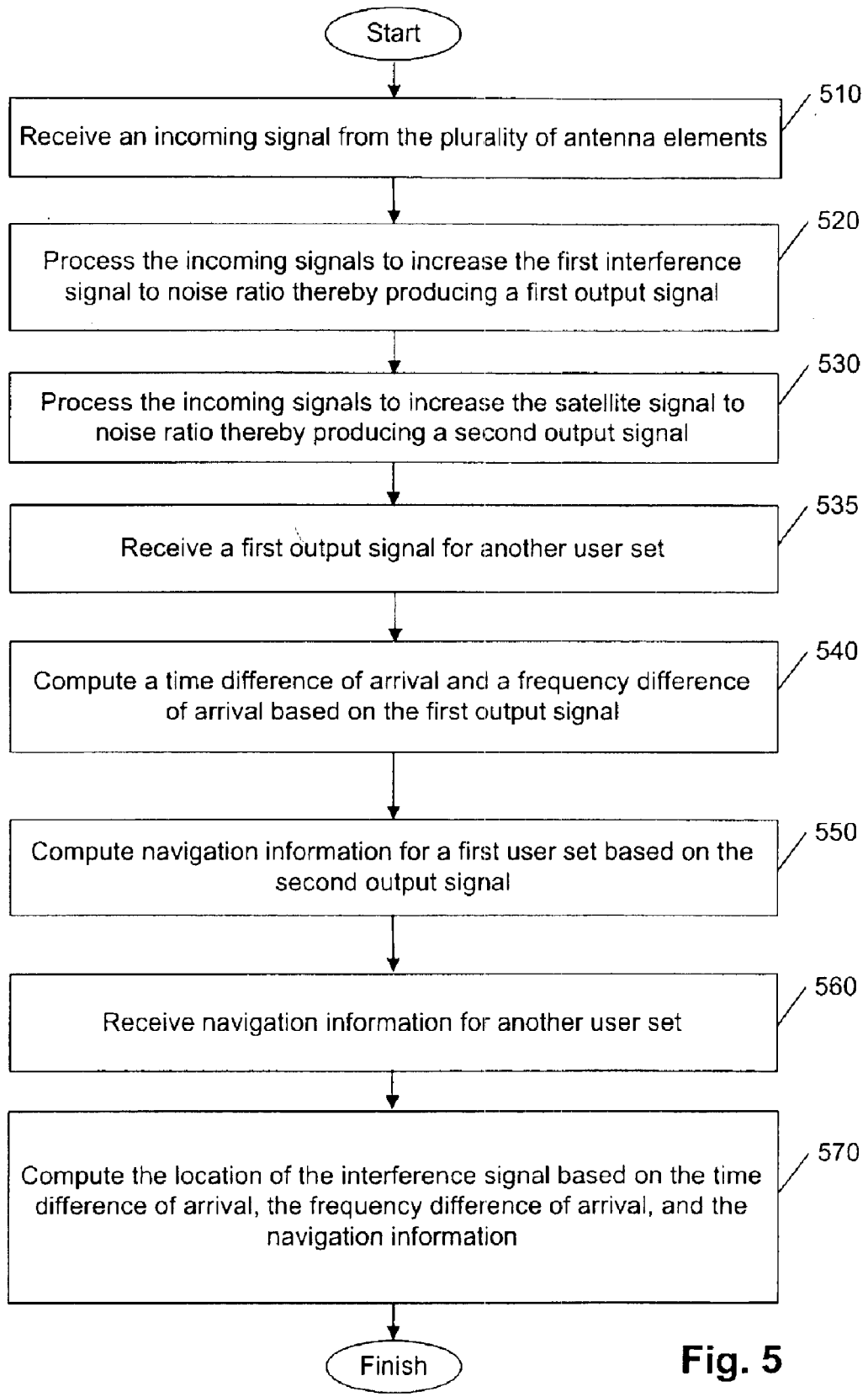
FIG. 5 illustrates a method for locating an interference source consistent with the present invention.

FIG. 5 illustrates a method for determining a location of an interference signal 401' consistent with the present invention. At stage 510, the digital A/J processor 425 receives incoming signals from the antennas 410. The incoming signals may comprise one or more satellite signals and/or one or more interference signals. The receivers 420 may filter, downconvert and digitize the incoming signals received by the antennas 410. The output from the receivers 420 may be passed to the digital A/J processor 425.

As discussed in greater detail below, the digital A/J processor 425 processes the incoming signals received from receivers 420 and may produce x+y outputs. The number, x, may equal the number of processing channels. The number, y, may equal the number of interference signals to be located. The x outputs are provided to corresponding processing channels 440. The y outputs are provided to the location filter 430. The digital A/J processor 425 may compute weights for the x outputs to improve satellite signal-to-noise ratio. However, the digital A/J processor 425 may compute weights for the y outputs to improve interference signal-to-noise ratio.

At stage 520, for the interference signal to be located, $S_I$, the digital A/J processor 425 processes the incoming signals to increase the interference signal to be located, $S_I$, to noise ratio, $(S_I/N)$, thereby producing a first output signal. The noise may comprise thermal and other noise, any other interference signals, and the one or more satellite signals. The digital A/J processor 425 computes weights to be applied to the incoming signals such that when the weighted incoming signals are processed, the signal-to-noise ratio, $S_I/N)$, is increased. A different weight set may be computed for each inference signal. For example, for two interference signals to be located $S_{I_1}$, $S_{I_2}$, the digital A/J processor 425 may compute two sets of weights to be independently applied to the incoming signals such that when the weighted incoming signals are processed, the signal-to-noise ratios, $(S_{I_1}/N)$ and $(S_{I_2}/N)$, are increased, respectively.

The weights computed and applied to the incoming signals may be computed to suppress interference signals other than the interference signal to be located, $S_I$. The other interference signals may be suppressed by computing weights to be applied to the incoming signals such that nulls are pointed at the other interfering signals. By suppressing the other interference signals, the signal-to-noise ratio, $(S_I/N)$, may be increased thereby facilitating the location of the interference signal to be located, $S_I$.

The weights computed and applied to the incoming signals may be computed to maximize the power received from a predetermined direction. For example, the digital A/J processor 425 may compute weights to steer a beam in a direction of the interference signal to be located, $S_I$. By steering a beam in the direction of the interference signal to be located, $S_I$, the signal-to-noise ratio, $(S_I/N)$, maybe increased thereby facilitating a more accurate location of the interference signal to be located, $S_I$. The direction of the interference signal to be located, $S_1$, used to steer the beam may be a direction previously determined for the interference signal to be located, $S_I$. The direction may have been previously determined utilizing the methods of the present invention, the methods disclosed in the '571 patent, or any other method.

Alternatively, the weights computed and applied to the incoming signals may be computed to steer a beam in a predetermined direction and to minimize the power received from other directions. For example, the digital A/J processor 425 may compute weights to steer a beam in a direction of the interference signal to be located, $S_I$, and to place nulls in a direction of any other signals, such as any other interference signals. As discussed above, the direction of the interference signal to be located, $S_I$, used to steer the beam may be a direction previously determined for the interference signal to be located, $S_1$. Similarly, the direction of any other signal used to place nulls may be a direction previously determined for the other signal. The direction of the other signal may have been previously determined utilizing the methods of the present invention, the methods disclosed in the '571 patent, or any other method.

As another alternative, the weights computed and applied to the incoming signals may be computed to steer a beam in a direction of the interference signal to be located, $S_I$, and to filter the incoming signals to pass frequencies within a bandwidth. The bandwidth may comprise the frequencies of the interference signal to be located, $S_I$.

The methods described above for processing the incoming signals to increase interference signal-to-noise ratio, $S_I/N)$, are exemplary. Any known method or system for increasing the signal-to-noise, $(S_I/N)$, ratio may be utilized. The particular method utilized may depend on the environment in which the systems and methods of the present invention are employed. For example, the particular method utilized for increasing the signal-to-noise ratio, $(S_I/N)$, may depend on factors such as the number of antenna elements, the number of interference signals present, the strength of the interference signals, and the location of the interference signals. Different methods may be used at different points in the process. For example, during a first iteration, the signal-to noise-ratio, $(S_I/N)$, may be increased by computing the weights that, when applied to the incoming signals, suppress interference signals other than the interference signal to be located, $S_I$, thereby increasing the signal-to-noise ratio, $(S_I/N)$. During the first iteration the location of the interference signal, $S_I$, may be located. During the second interaction, the location determined during the first iteration may be used to also steer a beam in the direction of the interference signal, $S_I$, thereby further increasing the signal-to-noise ratio, $(S_I/N)$ and improving the location accuracy of the interference signal, $S_I$.

At stage 530, the digital A/J processor 425 processes the incoming signals to increase a satellite signal-to-noise ratio, ($S_S/N$), thereby producing a second output signal. The noise may comprise thermal and other noise, any other satellite signals, and any interference signals. The digital A/J processor 425 computes weights to be applied to the incoming signals such that when the weighted incoming signals are processed, the satellite signal-to-noise ratio, ($S_S/N$), is increased. A different weight set may be computed for each satellite signal. For example, for two satellite signals $S_{S_1}$, $S_{S_2}$, the digital A/J processor 425 may compute two sets of weights to be independently applied to the incoming signals such that when the weighted incoming signals are processed, the satellite signal-to-noise ratios, ($S_{S_1}/N$) and ($S_{S_2}/N$), are increased, respectively.

The weights computed and applied to the incoming signals may be computed to minimize signal power received and to steer a beam in a predetermined direction. For example, the digital A/J processor 425 may compute weights to minimize signal power received and to steer a beam in a direction of the satellite signal, $S_S$. Any known method or system for increasing the satellite signal-to-noise ratio may be utilized.

The first output signal determined at stage 520 is received by the location filter 430 to digitally filter and decimate the signal, if necessary. The location filter 430 may time stamp at least one sample from which the time of each other sample may be derived. In addition, the location filter 430 may frequency stamp the collected data.

The cross-correlation processor 470 received the output of the location filter 430. At stage 535, the cross-correlation processor 470 also receives via data link 460 a corresponding output from location filter 430' of user set 402', which also intercepts and similarly processes the incoming signals received by user set 402.

At stage 540, the cross-correlation processor 470 cross-correlates the two first outputs to determine a TDOA and FDOA. Numerous digital or analog cross-correlation techniques are known to those of ordinary skill in the art. For example, an exemplary method for computing TDOA and FDOA may be found in Seymour Stein, "Algorithms for Ambiguity Function Processing," IEEE Transaction. ASSP (June 1981). The cross-correlation processor 470 may utilize a TDOA/FDOA cross-correlation technique that is substantially similar to the technique employed by a typical satellite based navigation device 100. The TDOA and FDOA are received by the emitter locator 480.

At stage 550, the navigation processor 450 receives the second output signal computed at step 530. The navigation processor 450 computes navigation information of the user set 402, such as PVT information, based on the second output signal. Systems and methods for computing navigation information, such as PVT information, are known to those of ordinary skill in the art. If, due to the one or more interference signals, valid PVT values for user set 402 can no longer be computed, the last valid PVT values computed by navigation processor 450 may be utilized. The navigation processor 450 may also use information from other navigation sensors, for example, an Inertial Navigation System (INS), when computing the navigation solution.

The navigation information for the user set 402 is received by the emitter locator 480. At stage 560, the emitter locator 480 also receives navigation information for user set 402' via data link 460. The navigation information for user set 402' is computed by navigation processor 450'.

At stage 570, the emitter locator 480 computes the location of the interference signal 401' based on the TDOA, FDOA, and navigation information for user sets 402, 402'.

When the location of the interference signal 401' is determined, corrective action may be taken to reduce the effects of the interference signal 401', such as disabling the source 401 of the interference signal or avoiding the interference signal 401'. The location information may be transmitted to a receiver at a remote location for corrective action to be taken.

It should be understood that while the invention may be advantageously employed for determining the location of an emitter of an RF signal that interferes with a satellite based navigation device, the invention may be employed to determine the location of any emission source within the passband of the receiver.

Figure 6:
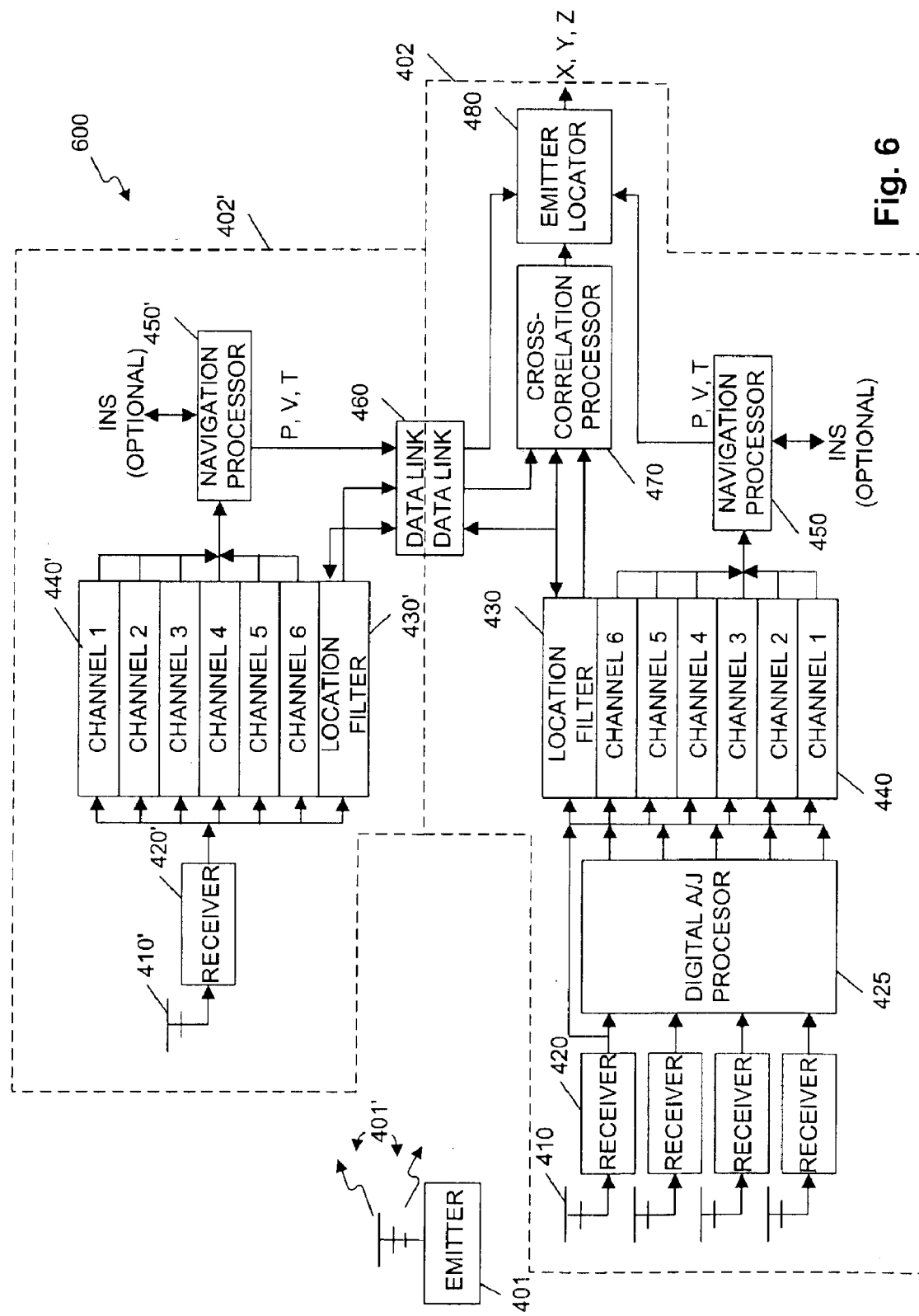
FIG. 6 illustrates a second embodiment of a satellite based navigation system for locating an interference source consistent with the present invention.
Figure 7:
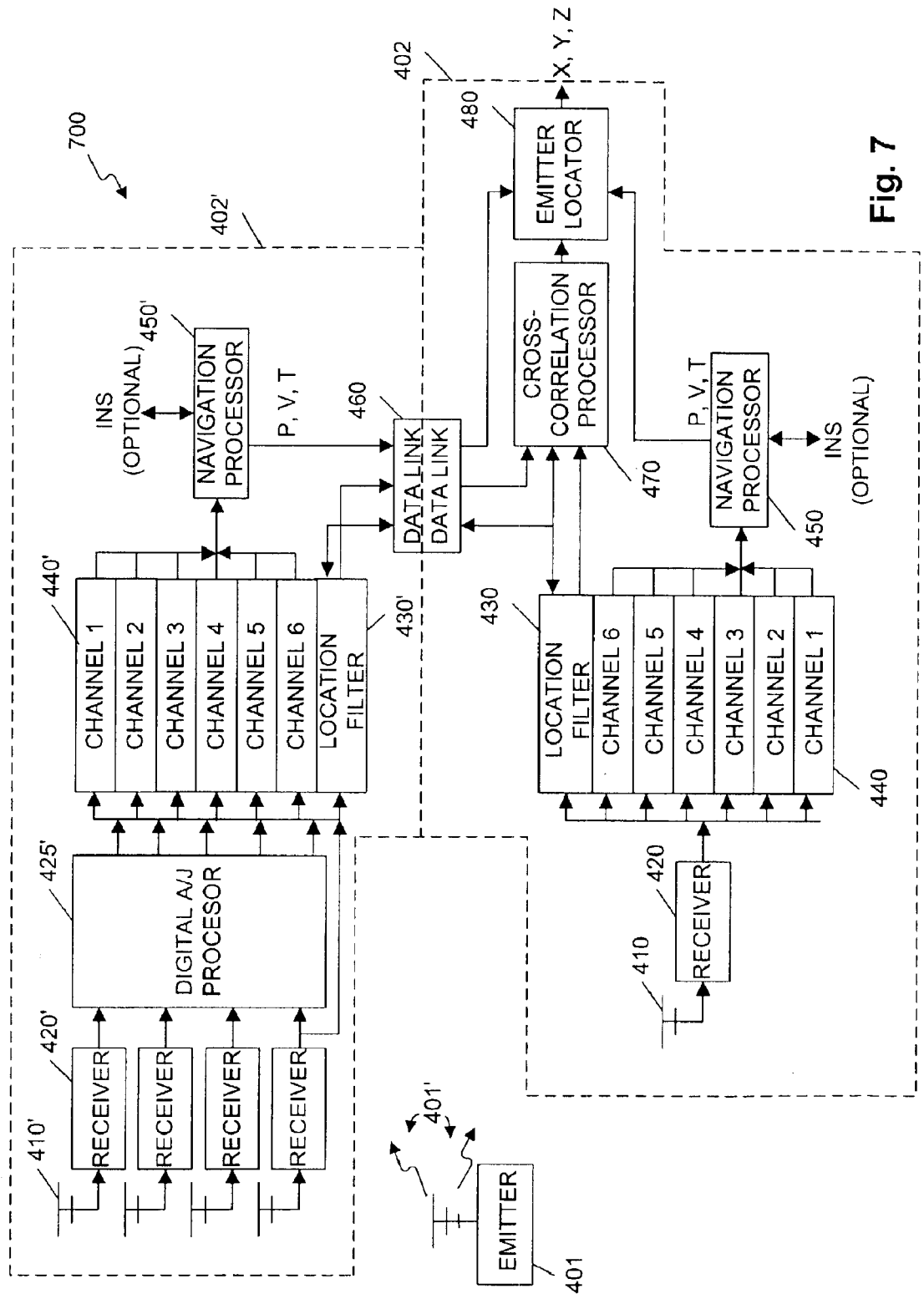
FIG. 7 illustrates a third embodiment of a satellite based navigation system for locating an interference source consistent with the present invention.

Other embodiments of the invention will be apparent to those skilled in the art from consideration of the specification and practice of the invention disclosed herein. For example, FIG. 6 illustrates a second embodiment of a satellite based navigation system 600 for locating an interference source 401 consistent with the present invention. The navigation system 600 is identical to the navigation system 400 illustrated in FIG. 4, except that the user set 402' of navigation system 600 does not include a digital A/J processor. FIG. 7 illustrates a third embodiment of a satellite based navigation system 700 for locating an interference source 401 consistent with the present invention. The navigation system 700 is identical to the navigation system 400 illustrated in FIG. 4, except that the user set 402 of navigation system 700 does not include a digital A/J processor. It is intended that the specification and examples be considered as exemplary only, with a true scope and spirit of the invention being indicated by the following claims.

What is claimed is:

1. A user set for facilitating the location of a first interference signal, comprising:
  at least one antenna element for receiving an incoming signal wherein the incoming signal comprises at least a satellite signal and the first interference signal; and
  an anti-jam processor configured to process the incoming signal received from the at least one antenna element to increase the first interference signal-to-noise ratio thereby producing a first output signal, the anti-jam processor further configured to process the incoming signal received from the at least one antenna element to increase the satellite signal-to-noise ratio thereby producing a second output signal.

2. The user set of claim 1, further comprising:
  a correlation processor configured to compute a time difference of arrival and a frequency difference of arrival based on the first output signal;
  a navigation processor configured to compute navigation information for the user set based on the second output signal; and
  a location processor configured to compute the location of the interference signal based on the time difference of arrival, the frequency difference of arrival, and the navigation information.

3. The user set of claim 2, further comprising:
  a data link to receive a first output signal and navigation information for another user set.

4. The user set of claim 1, wherein the incoming signal comprises a first interference signal and a second interference signal and wherein the anti-jam processor is configured to process the incoming signal received from the at least one antenna element to suppress the second interference signal to increase the first interference signal-to-noise ratio thereby producing the first output signal.

5. The user set of claim 1, wherein the anti-jam processor is configured to process the incoming signal received from the at least one antenna element to maximize signal power received from a predetermined direction to increase the first interference signal-to-noise ratio thereby producing the first output signal.

6. The user set of claim 5, wherein the anti-jam processor is configured to process the incoming signal received from the at least one antenna element to steer a beam in a direction of the first interference signal to increase the first interference signal to noise ratio thereby producing the first output signal.

7. The user set of claim 1, wherein the anti-jam processor is configured to process the incoming signal received from the at least one antenna element to steer a beam in a predetermined direction and minimize signal power received from other directions to increase the first interference signal-to-noise ratio thereby producing the first output signal.

8. The user set of claim 7, wherein the anti-jam processor is configured to process the incoming signal received from the at least one antenna element to steer a beam in a direction of the first interference signal and place nulls in a direction of any other interference signals received to increase the first interference signal-to-noise ratio thereby producing the first output signal.

9. The user set of claim 1, wherein the anti-jam processor is configured to process the incoming signal received from the at least one antenna element to steer a beam in a direction of the first interference signal and filter the incoming signals to pass frequencies within a bandwidth to increase the first interference signal-to-noise ratio thereby producing the first output signal, wherein the bandwidth comprises the frequencies of the first interference signal.

10. The user set of claim 1, wherein the anti-jam processor is configured to process the incoming signal received from the at least one antenna element to minimize signal power received to increase the satellite signal-to-noise ratio thereby producing a second output signal.

11. The user set of claim 1, wherein the anti-jam processor is configured to process the incoming signal received from the at least one antenna element to minimize signal power received and steer a beam in a direction of the satellite signal to increase the satellite signal-to-noise ratio thereby producing a second output signal.

12. The user set of claim 1, wherein the anti-jam processor is configured to process the incoming signal received from the at least one antenna element to steer a beam in a direction of the satellite signal to increase the satellite signal-to-noise ratio thereby producing the second output signal.

13. A method for facilitating the location of a first interference signal, comprising:
receiving an incoming signal from at least one antenna element wherein the incoming signal comprises at least a satellite signal and the first interference signal;
processing the incoming signal received from the at least one antenna element to increase the first interference signal-to-noise ratio thereby producing a first output signal; and
processing the incoming signal received from the at least one antenna element to increase the satellite signal-to-noise ratio thereby producing a second output signal.

14. A method according to claim 13, further comprising:
computing a time difference of arrival and a frequency difference of arrival based on the first output signal;
computing navigation information for a first user set based on the second output signal; and
computing the location of the interference signal based on the time difference of arrival, the frequency difference of arrival, and the navigation information.

15. The method according to claim 14, further comprising:
receiving a first output signal and navigation information for another user set.

16. The method according to claim 13, wherein:
the incoming signal further comprises a first interference signal and a second interference signal; and
processing the incoming signal received from the at least one antenna element to increase the first interference signal-to-noise ratio thereby producing a first output signal comprises processing the incoming signals to suppress the second interference signal.

17. The method according to claim 13, wherein processing the incoming signal received from the at least one antenna element to increase the first interference signal-to-noise ratio thereby producing a first output signal comprises processing the incoming signals to maximize signal power received from a predetermined direction.

18. The method according to claim 17, wherein processing the incoming signal received from the at least one antenna element to increase the first interference signal-to-noise ratio thereby producing a first output signal comprises processing the incoming signals to steer a beam in a direction of the first interference signal.

19. The method according to claim 13, wherein processing the incoming signal received from the at least one antenna element to increase the first interference signal-to-noise ratio thereby producing a first output signal comprises processing the incoming signals to steer a beam in a predetermined direction and minimize signal power received from other directions.

20. The method according to claim 19, wherein processing the incoming signal received from the at least one antenna element to increase the first interference signal-to-noise ratio thereby producing a first output signal comprises processing the incoming signals to steer a beam in a direction of the first interference signal and place nulls in a direction of any other received interference signals.

21. The method according to claim 13, wherein processing the incoming signal received from the at least one antenna element to increase the first interference signal-to-noise ratio thereby producing a first output signal comprises processing the incoming signals to steer a beam in a direction of the first interference signal and filter the incoming signals to pass frequencies within a bandwidth, wherein the bandwidth comprises the frequencies of the first interference signal.

22. The method according to claim 13, wherein processing the incoming signal received from the at least one antenna element to increase the satellite signal-to-noise ratio thereby producing a second output signal comprises processing the incoming signals to minimize signal power received.

23. The method according to claim 13, wherein processing the incoming signal received from the at least one antenna element to increase the satellite signal-to-noise ratio thereby producing a second output signal comprises processing the incoming signal to minimize signal power received and steer a beam in a direction of the satellite signal.

24. The method according to claim 13, wherein processing the incoming signal received from the at least one antenna element to increase the satellite signal-to-noise ratio thereby producing a second output signal comprises processing the incoming signals to steer a beam in a direction of the satellite signal.

25. A system for facilitating the location of a first interference signal, comprising:

means for receiving an incoming signal from at least one antenna element wherein the incoming signal comprises at least a satellite signal and the first interference signal;

means for processing the incoming signal received from the at least one antenna element to increase the first interference signal-to-noise ratio thereby producing a first output signal; and means for processing the incoming signal received from the at least one antenna element to increase the satellite signal-to-noise ratio thereby producing a second output signal.

26. A system according to claim 25, further comprising:

means for computing a time difference of arrival and a frequency difference of arrival based on the first output signal;

means for computing navigation information for a first user set based on the second output signal; and means for computing the location of the interference signal based on the time difference of arrival, the frequency difference of arrival, and the navigation information.

27. The system according to claim 26, further comprising:

means for receiving a first output signal and navigation information for another user set.

28. The system according to claim 25, wherein:

the incoming signal comprises a first interference signal and a second interference signal; and means for processing the incoming signal received from the at least one antenna element to increase the first interference signal-to-noise ratio thereby producing a first output signal comprises means for processing the incoming signals to suppress the second interference signal.

29. The system according to claim 25, wherein means for processing the incoming signal received from the at least one antenna element to increase the first interference signal-to-noise ratio thereby producing a first output signal comprises means for processing the incoming signals to maximize signal power received from a predetermined direction.

30. The system according to claim 29, wherein means for processing the incoming signal received from the at least one antenna element to increase the first interference signal-to-noise ratio thereby producing a first output signal comprises means for processing the incoming signals to steer a beam in a direction of the first interference signal.

31. The system according to claim 25, wherein means for processing the incoming signal received from the at least one antenna element to increase the first interference signal-to-noise ratio thereby producing a first output signal comprises means for processing the incoming signals to steer a beam in a predetermined direction and minimize signal power received from other directions.

32. The system according to claim 31, wherein means for processing the incoming signal received from the at least one antenna element to increase the first interference signal-to-noise ratio thereby producing a first output signal comprises means for processing the incoming signals to steer a beam in a direction of the first interference signal and place nulls in a direction of any other received interference signals.

33. The system according to claim 25, wherein means for processing the incoming signal received from the at least one antenna element to increase the first interference signal-to-noise ratio thereby producing a first output signal comprises means for processing the incoming signals to steer a beam in a direction of the first interference signal and filter the incoming signals to pass frequencies within a bandwidth, wherein the bandwidth comprises the frequencies of the first interference signal.

34. The system according to claim 25, wherein means for processing the incoming signal received from the at least one antenna element to increase the satellite signal-to-noise ratio thereby producing a second output signal comprises means for processing the incoming signals to minimize signal power received.

35. The system according to claim 25, wherein processing the incoming signal received from the at least one antenna element to increase the satellite signal-to-noise ratio thereby producing a second output signal comprises means for processing the incoming signal to minimize signal power received and steer a beam in a direction of the satellite signal.

36. The system according to claim 25, wherein means for processing the incoming signal received from the at least one antenna element to increase the satellite signal-to-noise ratio thereby producing a second output signal comprises means for processing the incoming signals to steer a beam in a direction of the satellite signal.

* * * * *